(12) United States Patent
Blake, III

(10) Patent No.: US 8,943,739 B2
(45) Date of Patent: Feb. 3, 2015

(54) PORTABLE FISHING EQUIPMENT ORGANIZER

(76) Inventor: Theodore D. Blake, III, Washington, NJ (US)

(*) Notice: Subject to any disclaimer, the term of this patent is extended or adjusted under 35 U.S.C. 154(b) by 574 days.

(21) Appl. No.: 13/222,110

(22) Filed: Aug. 31, 2011

(65) Prior Publication Data

US 2012/0047791 A1 Mar. 1, 2012

Related U.S. Application Data

(60) Provisional application No. 61/379,013, filed on Sep. 1, 2010.

(51) Int. Cl.
*A01K 97/06* (2006.01)
*A01K 97/10* (2006.01)
*A01K 97/08* (2006.01)

(52) U.S. Cl.
CPC .................. *A01K 97/08* (2013.01); *A01K 97/06* (2013.01); *Y10S 224/92* (2013.01); *Y10S 224/922* (2013.01)
USPC ......... 43/54.1; 43/21.2; 206/315.11; 224/920; 224/922; 224/259; 224/261; 224/262; 224/263

(58) Field of Classification Search
CPC ........ A01K 97/06; A01K 97/10; A01K 97/22
USPC .............. 43/54.1, 21.2; 206/315.11; 224/920, 224/922, 259, 261–263, 257, 260
See application file for complete search history.

(56) References Cited

U.S. PATENT DOCUMENTS

| | | | | | |
|---|---|---|---|---|---|
| 1,198,202 | A | * | 9/1916 | Drinkard | 43/21.2 |
| 2,555,073 | A | * | 5/1951 | Zdankoski | 43/54.1 |
| 2,909,215 | A | * | 10/1959 | Mitchell | 297/40 |
| 3,077,327 | A | * | 2/1963 | Batie et al. | 248/528 |
| 3,159,441 | A | * | 12/1964 | Silona | 43/54.1 |
| 3,472,339 | A | * | 10/1969 | Crisogono et al. | 182/116 |
| 3,628,204 | A | * | 12/1971 | Hoffman, Jr. | 43/21.2 |
| 3,803,742 | A | * | 4/1974 | Foster | 43/54.1 |
| 3,967,694 | A | * | 7/1976 | Woolfolk, Sr. | 182/82 |
| 4,005,541 | A | * | 2/1977 | Henrichsen | 43/57.2 |
| 4,043,070 | A | * | 8/1977 | Lamothe | 43/21.2 |
| 4,045,040 | A | * | 8/1977 | Fails | 224/921 |
| 4,086,716 | A | | 5/1978 | Donahue | |
| 4,177,595 | A | * | 12/1979 | Chon | 43/21.2 |
| 4,311,262 | A | | 1/1982 | Morin | |
| 4,362,307 | A | * | 12/1982 | Nakatani | 224/153 |
| 4,650,146 | A | | 3/1987 | Duke | |
| 4,671,009 | A | * | 6/1987 | Faunce | 43/54.1 |

(Continued)

FOREIGN PATENT DOCUMENTS

| CN | 2544529 Y | 4/2003 |
|---|---|---|
| CN | 2747878 Y | 12/2005 |

(Continued)

*Primary Examiner* — Darren W Ark
(74) *Attorney, Agent, or Firm* — Gearhart Law, LLC

(57) ABSTRACT

A portable fishing-equipment organizer with a tubular outer frame and a mounting pane attached to the frame. At least one pouch is attached to the mounting pane, along with at least one spike-shaped rod holder that may be detachably mounted. A telescoping tripod may be attached to the frame. When the organizer is carried, the tripod may be collapsed. When the tripod is extended, the organizer may be self standing, with the pouches at a convenient height for access. The organizer may be carried by one or more shoulder straps that may have pouches attached to them.

9 Claims, 5 Drawing Sheets

(56) References Cited

U.S. PATENT DOCUMENTS

| | | | | |
|---|---|---|---|---|
| 4,839,675 A | * | 6/1989 | Owen | 43/54.1 |
| 4,845,881 A | * | 7/1989 | Ward | 43/54.1 |
| 5,125,183 A | * | 6/1992 | Tisdell | 43/54.1 |
| 5,131,179 A | * | 7/1992 | McEwen | 43/54.1 |
| 5,275,316 A | * | 1/1994 | Kish | 224/261 |
| 5,294,163 A | * | 3/1994 | Lang | 43/54.1 |
| 5,331,761 A | * | 7/1994 | Kuthy | 43/54.1 |
| 5,367,815 A | * | 11/1994 | Liou | 43/21.2 |
| 5,375,905 A | * | 12/1994 | Flitter et al. | 43/54.1 |
| 5,381,936 A | * | 1/1995 | Beery et al. | 224/153 |
| 5,409,291 A | * | 4/1995 | Lamb et al. | 224/155 |
| 5,433,358 A | * | 7/1995 | Millard | 224/153 |
| 5,533,295 A | * | 7/1996 | Hochberger | 43/21.2 |
| 5,560,137 A | * | 10/1996 | Herring | 43/21.2 |
| 5,630,537 A | | 5/1997 | Sciacca | |
| 5,636,469 A | * | 6/1997 | Pizzolo et al. | 43/54.1 |
| 5,642,846 A | * | 7/1997 | Morrow | 224/576 |
| 5,664,721 A | | 9/1997 | Homeyer | |
| 5,758,933 A | * | 6/1998 | Clendening | 206/315.11 |
| 5,842,614 A | * | 12/1998 | Morrow | 224/261 |
| 5,862,967 A | | 1/1999 | Johnson | |
| 5,899,527 A | * | 5/1999 | Elvidge et al. | 297/188.14 |
| 5,941,015 A | * | 8/1999 | Jenkins | 43/54.1 |
| 5,950,352 A | * | 9/1999 | Volmer | 43/54.1 |
| 5,975,393 A | * | 11/1999 | Bellamy | 206/315.11 |
| 6,036,067 A | * | 3/2000 | Alcorn | 43/54.1 |
| 6,047,491 A | * | 4/2000 | De Busk | 43/21.2 |
| 6,048,023 A | * | 4/2000 | Lampton | 297/129 |
| 6,055,764 A | | 5/2000 | Armanno, Sr. | |
| 6,082,757 A | * | 7/2000 | Lin | 280/654 |
| 6,217,113 B1 | * | 4/2001 | Knatz | 297/118 |
| 6,269,587 B1 | | 8/2001 | Wallace | |
| 6,341,443 B1 | | 1/2002 | Watford et al. | |
| 6,374,532 B1 | * | 4/2002 | Klein | 43/54.1 |
| 6,435,390 B1 | * | 8/2002 | Abramowicz | 224/920 |
| 6,446,382 B1 | * | 9/2002 | Cloutier et al. | 43/54.1 |
| 6,487,814 B1 | * | 12/2002 | Arredondo et al. | 43/54.1 |
| 6,591,540 B1 | | 7/2003 | Chargois | |
| 6,923,357 B2 | * | 8/2005 | Smith | 43/21.2 |
| 7,278,234 B2 | * | 10/2007 | Marino | 43/54.1 |
| 7,320,470 B1 | * | 1/2008 | Butera | 280/47.18 |
| 7,389,608 B1 | * | 6/2008 | MacKay | 43/54.1 |
| 7,415,794 B1 | * | 8/2008 | Thompson | 43/54.1 |
| 8,052,020 B1 | * | 11/2011 | Wurtz | 43/54.1 |
| 2003/0000986 A1 | * | 1/2003 | Smith | 224/637 |
| 2003/0051388 A1 | * | 3/2003 | Barnes et al. | 43/21.2 |
| 2003/0173390 A1 | | 9/2003 | Smith | |
| 2007/0152007 A1 | | 7/2007 | Kauss | |
| 2007/0164063 A1 | * | 7/2007 | Concepcion | 224/153 |
| 2007/0289199 A1 | * | 12/2007 | Looney | 43/54.1 |
| 2009/0071058 A1 | * | 3/2009 | Chavez et al. | 43/54.1 |
| 2012/0043358 A1 | * | 2/2012 | Kelly | 43/54.1 |

FOREIGN PATENT DOCUMENTS

| | | | | |
|---|---|---|---|---|
| CN | 2817434 Y | | 9/2006 | |
| JP | 5015284 A | | 1/1993 | |
| JP | 10084833 A | | 4/1998 | |
| JP | 2002335841 A | | 11/2002 | |
| JP | 2004187664 A | | 7/2004 | |
| JP | 2007151421 A | * | 6/2007 | A01K 97/10 |
| JP | 2008193989 A | | 8/2008 | |
| JP | 2009050187 A | * | 3/2009 | A01K 97/10 |
| JP | 2013123381 A | * | 6/2013 | A01K 97/10 |
| WO | WO 2007079387 A3 | | 7/2007 | |
| WO | WO 2007091861 A1 | | 8/2007 | |
| WO | WO 2007127406 A3 | | 11/2007 | |

* cited by examiner

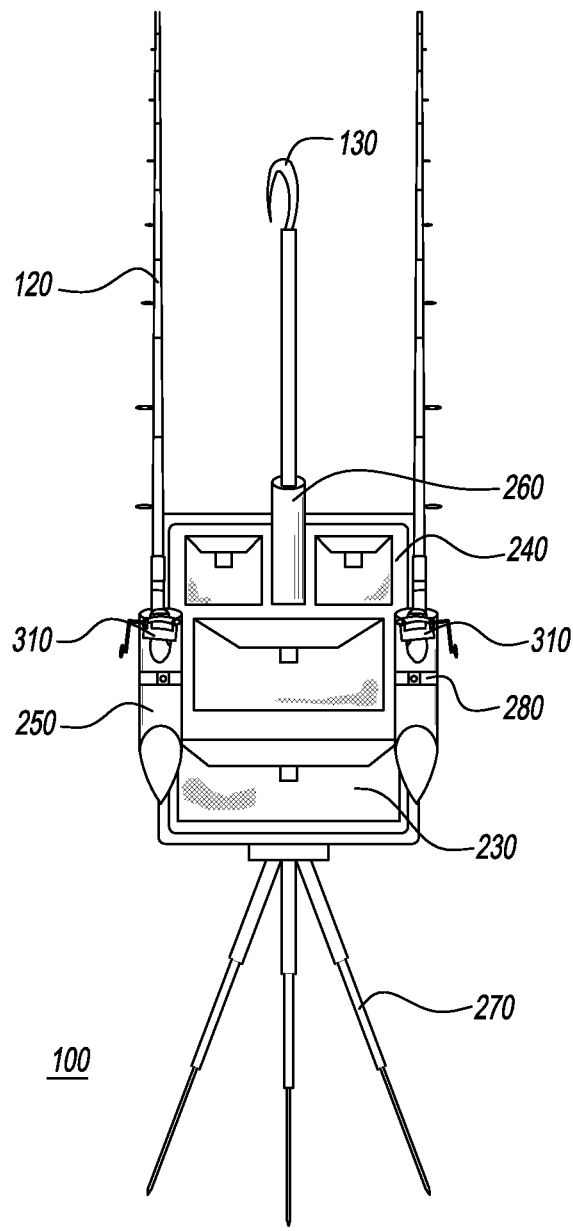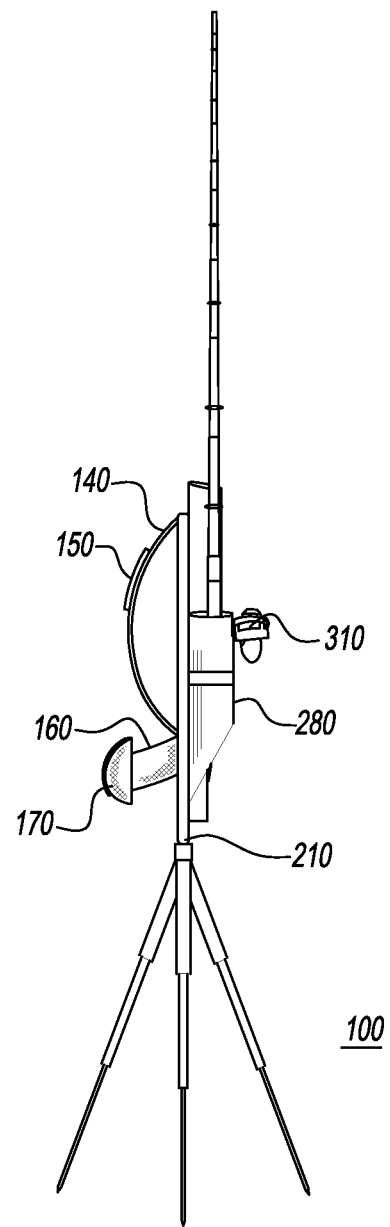
FIG. 3
FIG. 4

PORTABLE FISHING EQUIPMENT ORGANIZER

CLAIM OF PRIORITY

This application claims priority to U.S. Ser. No. 61/379,013 filed Sep. 1, 2010, the contents of which are fully incorporated herein by reference.

FIELD OF THE INVENTION

The invention relates to portable organizers, and more specifically to portable, self-standing organizers for fishing equipment.

BACKGROUND OF THE INVENTION

The invention relates to a self-contained, portable device that enables a surf fisherman to organize, and easily transport, all the various equipment that he may need as he changes location in pursuit of fish.

Surf fisherman attempting to fish a fast moving school of game fish need to be at the right place, at the right time, with the right equipment. To be effective, they have to be able to move rapidly and often, carrying all the gear necessary for fishing from the various terrains they may encounter, which may include rocky coastline, sand dunes, beaches and even, occasionally, jetties and piers.

The relevant prior art involving portable organizers for fishing gear includes:

DESCRIPTION OF THE RELATED ART

US Patent Application 20030051388 entitled "Fishing rod carrier" that describes a back mounted, hands-free rod carrier capable of holding and transporting a plurality of rods and reels in a vertical orientation and requiring no support from the arms or hands. The rod carrier can be inexpensively constructed of lightweight PVC pipe segments and is held in place by adjustable nylon straps secured by quick-release fasteners.

U.S. Pat. No. 5,642,846 titled "Backpack support apparatus" that describes a backpack support apparatus includes first, second, and third poles and first, second, and third couplings that removably couple the poles to a backpack frame to form a tripod-like support configuration. The couplings hold the poles so that the poles angle away from the backpack frame advantageously for improved stability. In addition, the couplings hold the poles in a way enabling a user to remove the poles easily by lifting the backpack frame. The couplings may be part of the backpack frame, they may be attached to a backpack frame as original equipment, or they may be mounted as retrofit equipment on an existing backpack frame. The poles in one embodiment slide together to form a walking staff, and a separate hook attaches to the third pole to adapt it to use in mounting a bear bag over a tree limb.

U.S. Pat. No. 5,275,316 entitled "Fisherman's back pack" that describes a back pack arranged for use by fishermen, to include a first housing for containment of fishing paraphernalia and clothing storage cooperative with a removable fish storage bag for ease of cleaning and manipulation thereof. A bait box having a removable fluid impermeable liner is mounted to a front wall of the housing, with fishing gear pockets mounted to at least one of the side walls of the housing. A rigid framework having a U-shaped base is mounted at an intersection of the floor and side wall and front wall structure of the housing to include parallel frame legs extending at a junction of the rear wall and side walls of the housing terminating in fishing pole mounting tubes. Each of the fishing pole mounting tubes includes a matrix of resilient projections projecting radially into the tubes for securement of a fishing pole during a fishing procedure.

U.S. Pat. No. 4,086,716 titled "Fishing pole tripod" that describes a fish pole tripod made up of an elongated main support rod pointed at its first end for ground insertion and a rod clevis supported on the second end of the main rod support. V-shaped pointed legs are swingably supported on the second end of said rod support and a tubular rod handle holder is fixed to the rod support adjacent the pointed end thereof.

Various implements are known in the art, but fail to address all of the problems solved by the invention described herein. One embodiment of this invention is illustrated in the accompanying drawings and will be described in more detail herein below.

SUMMARY OF THE INVENTION

The present invention discloses a portable fishing equipment organizer having a frame with a means for carrying the portable fishing equipment organizer attached to the frame. There may be at least one spike-shaped rod holder detachably mounted to the frame, along with at least one pouch mounted and a telescoping tripod.

In a preferred embodiment of the invention, the means for carrying the portable fishing equipment organizer may be one or more shoulder straps, such as, but not limited to, the straps of a back-pack. The carrying straps may themselves have one or more pouches attached to them.

The portable fishing equipment organizer may also have an adjustable waist belt that may also have a belt-lure pouch attached to it.

Therefore, the present invention succeeds in conferring the following, and others not mentioned, desirable and useful benefits and objectives.

It is an object of the present invention to provide a self-contained, portable fishing equipment organizer suitable for a surf fisherman.

It is another object of the present invention to provide a fishing equipment organizer that is self-standing, mobile and has the storage capacity necessary for a large selection of tackle.

Yet another object of the present invention is to provide a portable fishing equipment organizer that may allow an angler to be ready to change locations at a moments notice while carrying all the tackle he may need in a variety of different conditions, such as, but not limited to, a rocky coastline, sand dunes, beaches and jetties.

Still another object of the present invention is to provide a portable fishing equipment organizer that is easy to load.

Still another object of the present invention is to a portable fishing equipment organizer that will keep the equipment out of the water, and therefore, dry, even on a beach.

BRIEF DESCRIPTION OF THE DRAWINGS

FIG. 3 shows a back view of the preferred embodiment of the present invention.

FIG. 4 shows a side view of the preferred embodiment of the present invention.

DESCRIPTION OF THE PREFERRED EMBODIMENTS

Figure 1:
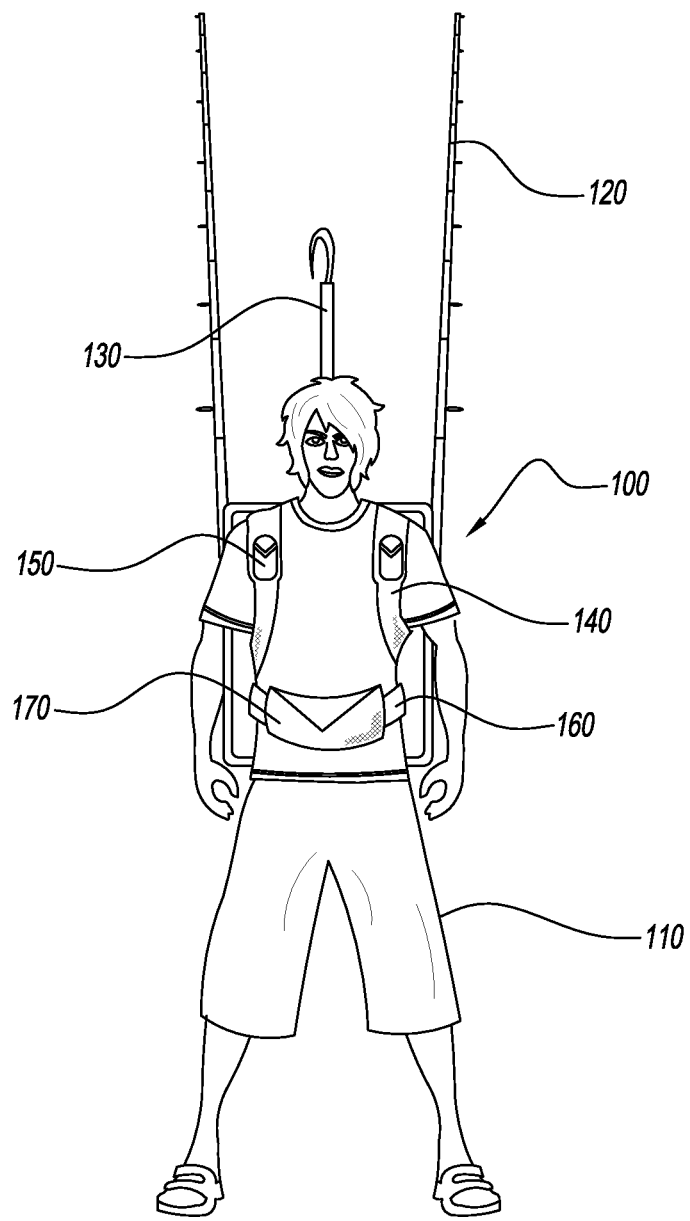
FIG. 1 shows a preferred embodiment of the present invention, being carried by a fisherman.

The preferred embodiments of the present invention will now be described with reference to the drawings. Identical elements in the various figures are identified with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a preferred embodiment of the portable fishing equipment organizer 100 of the present invention, being carried by a fisherman 110. As shown, the portable fishing equipment organizer 100 is loaded with two fishing rods 120 and a fishing gaff 130, though one of ordinary skill in the art will readily appreciate that the portable fishing equipment organizer 100 may be loaded with no fishing rod 120, one fishing rod 120 or more fishing rods 120. Similarly, the may be no portable fishing equipment organizer 100 may be loaded with no fishing gaff 130 or more fishing gaffs 130.

As shown, the fisherman 110 is carrying the portable fishing equipment organizer 100 using a pair of shoulder straps 140. The shoulder straps 140 may each have a small utility pouch 150 attached to them. The portable fishing equipment organizer 100 may also be secured to the fisherman 110 by a waist belt 160. The waist belt 160, as shown, also has an optional belt lure pouch 170 attached to it.

Figure 2:
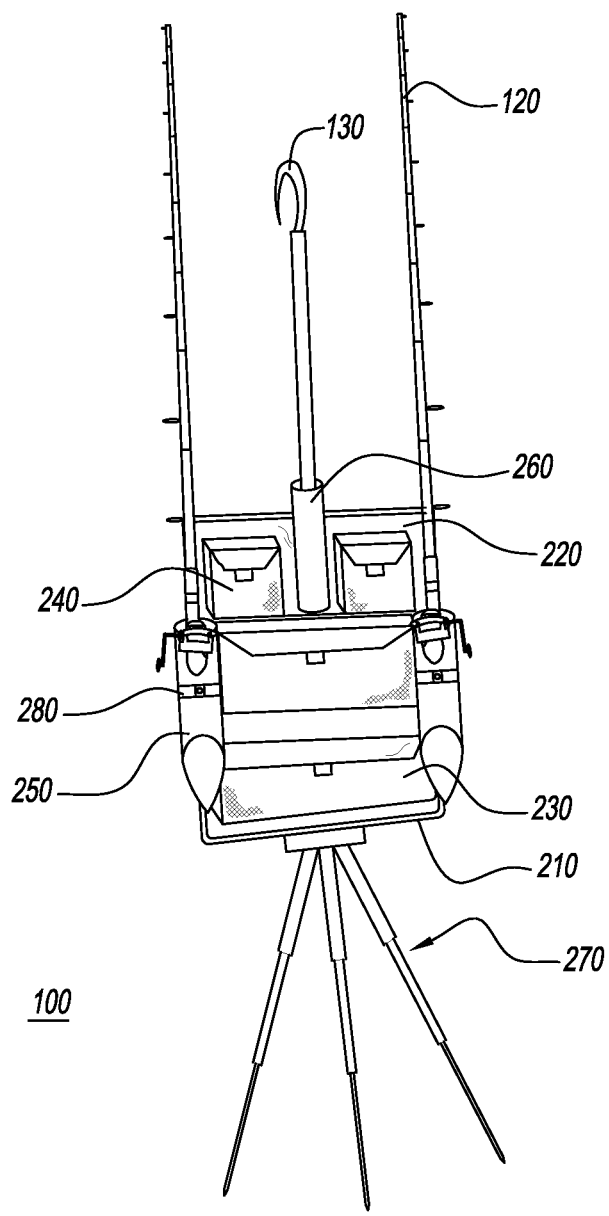
FIG. 2 shows a rear perspective view of the preferred embodiment of the present invention.

FIG. 2 shows a rear perspective view of the preferred embodiment of the portable fishing equipment organizer 100. This view shows the construction of a preferred embodiment of the portable fishing equipment organizer 100 that has a tubular outer frame 210. Secured to the tubular outer frame 210 is a mounting pane 220. The tubular outer frame 210 may, for instance, be made of a suitably light but strong and resistant to corrosion by sea-water material such as, but not limited to, wood, plastic, marine-grade anodized aluminum, light-weight stainless steel, carbon fiber, or some combination thereof. The mounting pane 220 may, for instance, be made of a suitably strong and hard wearing natural or synthetic fabric such as, but not limited to, nylon, rayon, ballistic nylon, rip-stop nylon of a suitable weight, canvas, or some combination thereof.

FIG. 2 also shows a number of pouches attached to the mounting pane 220. The pouches may be sized differently to accommodate, or otherwise optimize their use, for certain items. For instance, the pouches may be sized to accommodate different items. For instance, a lure bag 230 may be sized to be suitable for storing lures, while a tackle pouch 240 may be sized to be suitable for storing general tackle. The lure bag 230 and the tackle pouch 240 may, for instance, be made of suitable, preferably waterproof and hard wearing, natural or synthetic material such as, but not limited to, canvas or nylon, rayon, ballistic nylon, rip-stop nylon of a suitable weight, or some combination thereof. The pouches may have flap closures that may, for instance, be held closed by a releasable fastening such as, but not limited to, hook and loop fasteners, buttons, snap fasteners or buckle fasteners or some combination thereof. The pouches may be attached to the mounting pane 220 by stitching with a suitable thread, by gluing, stapling with corrosion resistant staples, or by some combination thereof.

FIG. 2 also shows sand-spike shaped, detachable, fishing rod holders 250, removably attached to the tubular outer frame 210 by releasable mounting clamps 280. The bottoms of the sand-spike shaped, detachable, fishing rod holder 250 are tapered down to a point so that once removed from the portable fishing equipment organizer 100, the sand-spike shaped, detachable, fishing rod holders 250 may be driven into sand and used to hold the fishing rods 120. One of ordinary skill in the art will readily appreciate that the detachable, fishing rod holders 250 may instead simply be tubular, may not function as sand-spikes and may also not be removable from the tubular outer frame 210 or the mounting pane 220.

The portable fishing equipment organizer 100 may also have one or more tubular gaff or rod holders 260. The tubular gaff or rod holder 260 may be secured to the tubular outer frame 210 or to the mounting pane 220 or to both.

The sand-spike shaped, detachable, fishing rod holder 250 and the tubular gaff or rod holder 260 may, for instance, be made of suitably strong, light and corrosion resistant material such as, but not limited to, aluminum tubing, marine-grade anodized aluminum, light-weight stainless steel, galvanized steel, brass, bronze, carbon fiber, ABS rubber, nylon or some combination thereof.

Also shown in FIG. 2 is a telescoping tripod 270 attached to the base of the tubular outer frame 210. The telescoping tripod 270 may, for instance, be made of a suitable strong, light and corrosion resistant material such as, but not limited to, wood, plastic, aluminum tubing, marine-grade anodized aluminum, light-weight stainless steel, galvanized steel, brass, bronze, carbon fiber, ABS rubber, nylon or some combination thereof.

FIG. 3 is a back view of the preferred embodiment of the present invention, showing the portable fishing equipment organizer 100 having two sand-spike shaped, detachable, fishing rod holders 250 loaded with fishing rods 120 and fishing reels 310; one tubular gaff or rod holder 260 loaded with a fishing gaff 130; and two lure bags 230 and two tackle pouches 240, all the pouches being closed by flaps.

The telescoping tripod 270 of the portable fishing equipment organizer 100 is shown extended. The extended telescoping tripod 270 allows the portable fishing equipment organizer 100 to stand upright and for the stored gear and tackle to be kept well of the ground. This may be of use in, for instance, fishing on a beach when the tide is coming in. Having the pouches off the ground, only the telescoping tripod 270 of the portable fishing equipment organizer 100 will get wet if an unexpectedly large wave materializes. Having the pouches off the ground also allows easy access to the pouches, both for loading them and for retrieving their contents.

FIG. 4 is a side view of the preferred embodiment of the portable fishing equipment organizer 100, showing the shoulder straps 140 attached to the tubular outer frame 210. The shoulder straps 140 may have one or more utility pouches 150 attached to them. One of ordinary skill in the art will readily appreciate that the shoulder straps 140 may instead, or also, be attached to the mounting pane 220. The waist belt 160, and its belt lure pouch 170, may also be attached to either the tubular outer frame 210 or the mounting pane 220, or both. Both the shoulder straps 140 and the waist belt 160 may, for instance, be made of a suitably strong natural or synthetic fabric such as, but not limited to, nylon, rayon, ballistic nylon, rip-stop nylon of a suitable weigh, or canvas, or some combination thereof. They may both adjust in length by means of, for instance, a suitable fastener such as, but not limited to, a buckle, hook and loop fastener or some combination thereof. They both may also have suitable foam, or other padding, placed so as to make the portable fishing equipment organizer 100 more comfortable to carry.

Figure 5:
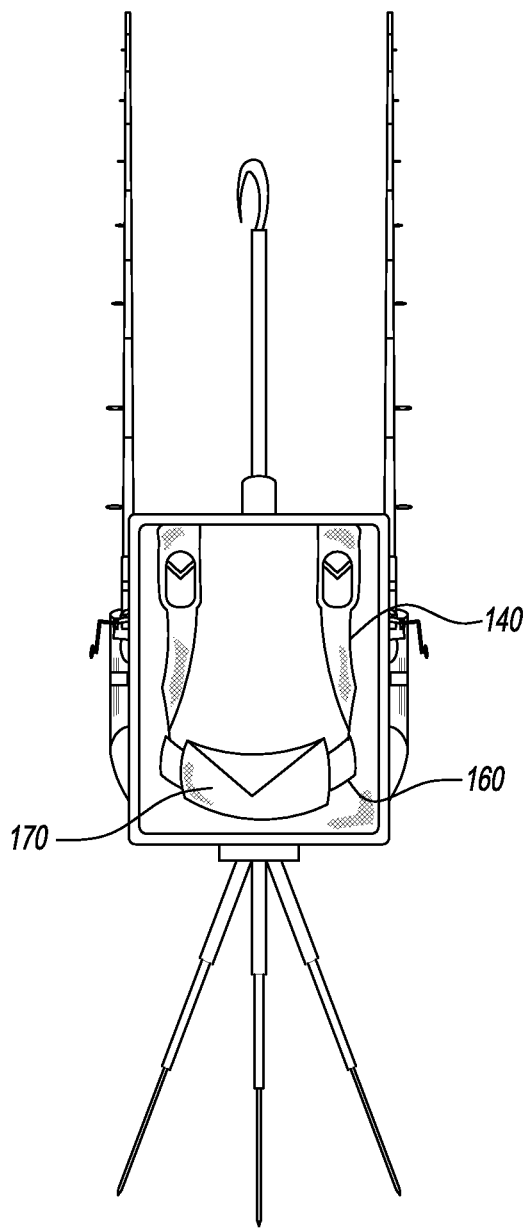
FIG. 5 shows a front view of the preferred embodiment of the present invention.

FIG. 5 shows a front view of the preferred embodiment of the portable fishing equipment organizer 100. In this view, the shoulder straps 140 and the waist belt 160 are more clearly depicted.

Figure 6:
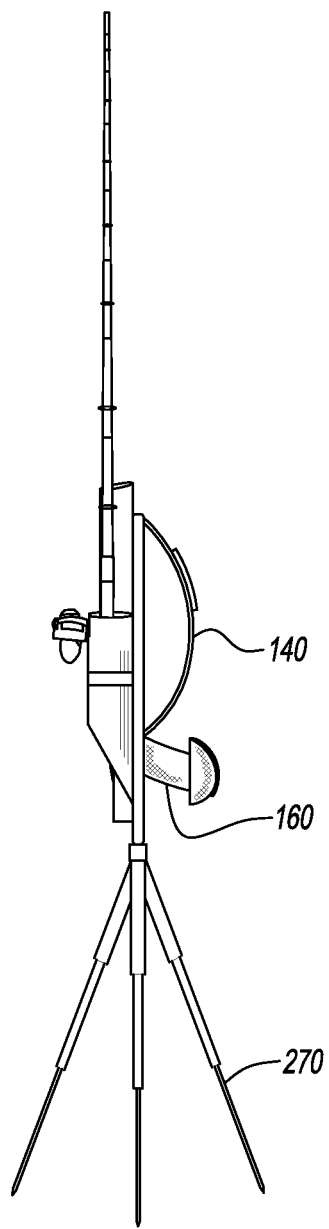
FIG. 6 shows a further side view of the preferred embodiment of the present invention.

FIG. 6 shows a further side view of the preferred embodiment of the portable fishing equipment organizer 100. The telescoping tripod 270 is shown extended so that the portable fishing equipment organizer 100 may stand upright. In order to carry the portable fishing equipment organizer 100, a fisherman 110 may collapse the telescoping tripod 270 with one hand while holding the portable fishing equipment organizer 100 by means of a shoulder strap 140 with his other hand. Having collapsed the telescoping tripod 270, the fisherman 110 may then put on the portable fishing equipment organizer 100 by extending his arm through the shoulder straps 140 one at a time. The telescoping tripod 270 may also be detachable from the tubular outer frame 210 and may be carried independently of the portable fishing equipment organizer 100 or may be attachable to the mounting pane 220 such that movement of the fisherman 110 is not impeded by it.

Figure 7:
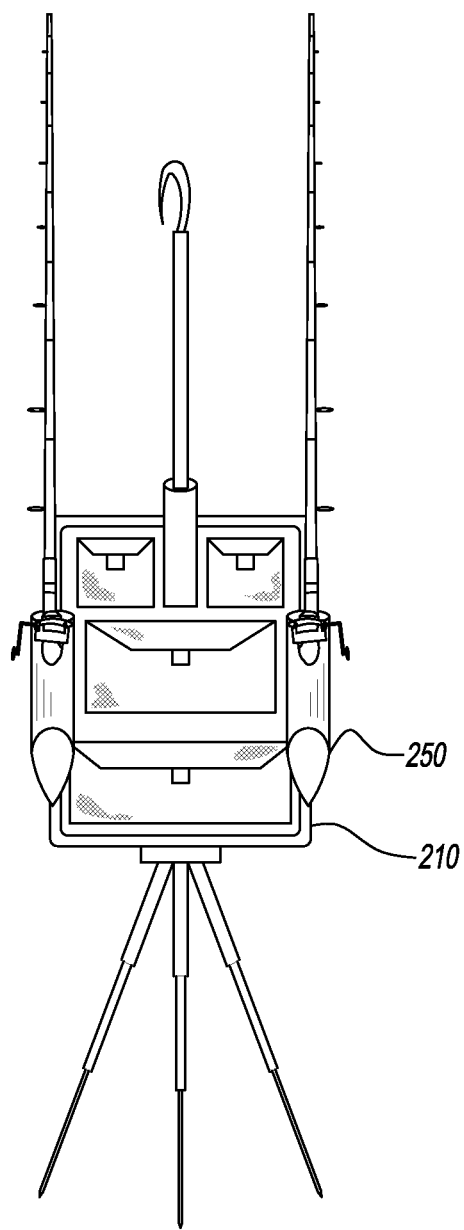
FIG. 7 shows a back view of a further, preferred embodiment of the present invention.

FIG. 7 shows a back view of a further, preferred embodiment of the portable fishing equipment organizer 100. In this embodiment, the sand-spike-shaped, detachable, fishing rod holders 250 are secured to the tubular outer frame 210 by means other than the releasable mounting clamp 280.

One of ordinary skill in the art will readily appreciate that though the telescoping tripod 270 has been depicted in the accompanying drawings as being rigidly attached to the tubular outer frame 210, it may instead be swivel mounted so that it may be either stored aligned horizontally, aligned with the bottom of the tubular outer frame 210, or stored aligned vertically, against the back of the pouches.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A portable fishing equipment organizer, comprising:
    a frame comprising a tubular outer frame having a plurality of sides which define a perimeter, said tubular outer frame having a mounting pane attached thereto within said perimeter;
    means for carrying said portable fishing equipment organizer, attached to said frame;
    at least one spike-shaped rod holder detachably mounted to said frame;
    at least one frame pouch mounted on said frame; and
    a telescoping tripod comprising an upper end, a lower end, and three legs which are located adjacent each other at the upper end and diverge from each other from said upper end toward said lower end, said upper end attached to said frame on one of said plurality of sides of said tubular outer frame.

2. The organizer of claim 1 wherein said means for carrying said portable fishing equipment organizer is one or more shoulder straps.

3. The organizer of claim 2 further comprising one or more shoulder strap pouches attached to said one or more shoulder straps.

4. The organizer of claim 3 wherein said one or more shoulder strap pouches attached to said one or more shoulder straps are sized to be utility pouches.

5. The organizer of claim 1 further comprising an adjustable waist belt.

6. The organizer of claim 5 further comprising a belt-lure pouch affixed to said adjustable waist belt.

7. The organizer of claim 1 wherein said at least one frame pouch is affixed to said mounting pane.

8. The organizer of claim 7 further comprising at least a lure bag and a pouch,
    wherein said lure bag is sized to hold lures and said tackle pouch is sized to hold general fishing tackle.

9. The organizer of claim 1 further comprising at least one tubular, gaff-or-rod holder.

* * * * *